US007005024B2

(12) United States Patent
Debalme et al.

(10) Patent No.: US 7,005,024 B2
(45) Date of Patent: *Feb. 28, 2006

(54) PROCESS AND DEVICE FOR THE MANUFACTURE OF A COMPOSITE MATERIAL

(75) Inventors: Jean-Paul Debalme, Chambery (FR); Dominique Loubinoux, Terrasse (FR)

(73) Assignee: Saint-Gobain Vetrotex France S.A., Chambery (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,518

(22) PCT Filed: Jan. 17, 1997

(86) PCT No.: PCT/FR97/00101

§ 371 (c)(1),
(2), (4) Date: Apr. 6, 2004

(87) PCT Pub. No.: WO97/26397

PCT Pub. Date: Jul. 24, 1997

(65) Prior Publication Data

US 2001/0032696 A1    Oct. 25, 2001

(30) Foreign Application Priority Data

Jan. 19, 1996 (FR) .................................. 96 00578

(51) Int. Cl.
B32B 31/00 (2006.01)
(52) U.S. Cl. ................... 156/148; 156/181; 156/308.2; 156/309.6; 156/324; 156/583.5

(58) Field of Classification Search ................ 156/148, 156/169, 172, 173, 175, 62.2–62.8, 308.2, 156/309.6, 324, 181, 583.5
See application file for complete search history.

(56) References Cited

U.S. PATENT DOCUMENTS

| | | | | |
|---|---|---|---|---|
| 2,543,101 A | * | 2/1951 | Francis | |
| 3,873,388 A | * | 3/1975 | Hunter | 156/148 |
| 4,129,675 A | * | 12/1978 | Scott | 428/288 |
| 4,410,385 A | * | 10/1983 | Murphy et al. | 156/181 |
| 4,743,187 A | * | 5/1988 | Schermutzki | 156/583.5 |
| 4,800,113 A | * | 1/1989 | O'Connor | 156/175 |
| 4,818,318 A | | 4/1989 | McMahon et al. | |
| 5,021,289 A | | 6/1991 | Light et al. | |
| 5,149,391 A | * | 9/1992 | Li et al. | 156/181 X |

(Continued)

FOREIGN PATENT DOCUMENTS

CA       2010285 A    *  8/1990

(Continued)

*Primary Examiner*—Jeff H. Aftergut
(74) *Attorney, Agent, or Firm*—Oblon, Spivak, McClelland, Maier & Neustadt, P.C.

(57) ABSTRACT

A method for making a composite material by continuously depositing glass yarns on a moving substrate, at least 80 wt % of the yarns being blended yarns consisting of intimately mixed glass filaments and thermoplastic organic material filaments, and the amount of deposited glass being equal to over 40 wt % of the total amount of material deposited in the form of glass yarns and organic material; transferring the combined glass yarns and organic material to a number of areas where they are heated, compressed and cooled, and specifically heated and/or cooled while simultaneously being compressed; and cutting the resulting assembly into plates or winding it onto a revolving drum.

14 Claims, 4 Drawing Sheets

U.S. PATENT DOCUMENTS

Figure 1:
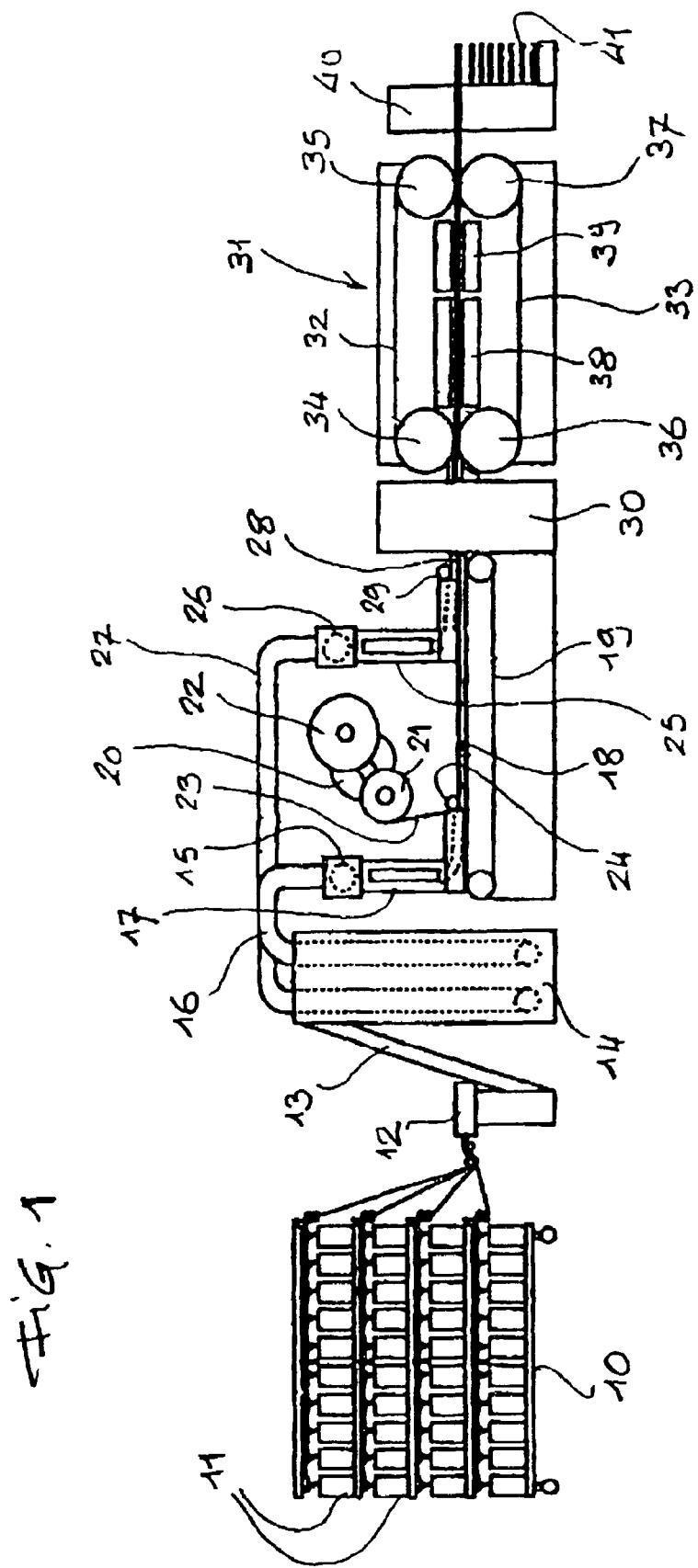

| | | | |
|---|---|---|---|
| 5,201,979 A * | 4/1993 | Koba et al. | 156/583.5 X |
| 5,227,236 A | 7/1993 | Handermann | |
| 5,264,274 A | 11/1993 | Shigeta et al. | |
| 5,445,693 A * | 8/1995 | Vane | 156/148 X |
| 5,529,826 A * | 6/1996 | Tailor et al. | 428/110 |
| 5,618,364 A * | 4/1997 | Kwok | 156/628 |

FOREIGN PATENT DOCUMENTS

| | | | | |
|---|---|---|---|---|
| EP | 408898 | * | 1/1991 | 156/181 |
| EP | 466618 A1 | * | 1/1992 | |
| EP | 0630735 A2 | * | 12/1994 | |
| GB | 1200342 | * | 7/1970 | 156/179 |
| GB | 2040801 A | * | 9/1980 | |
| GB | 2093768 | * | 9/1982 | 156/148 |
| JP | 04-201412 A | * | 7/1992 | |
| WO | 9014457 | * | 11/1990 | |
| WO | WO 94 21452 A | | 9/1994 | |

* cited by examiner

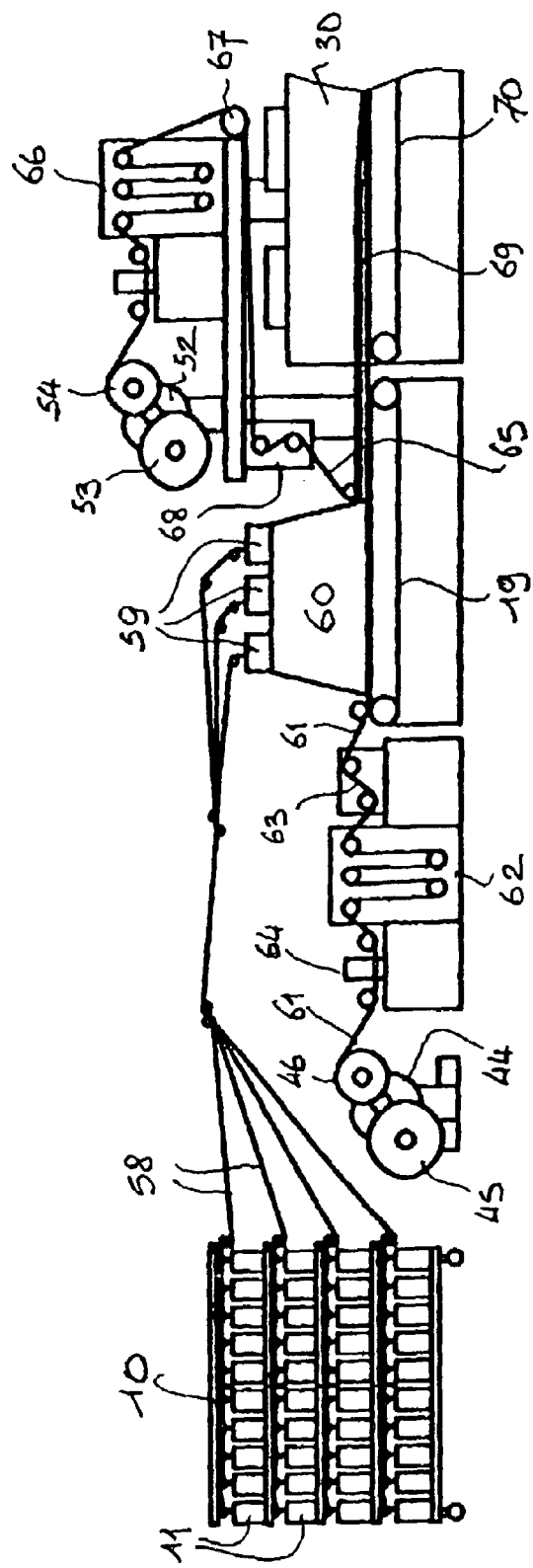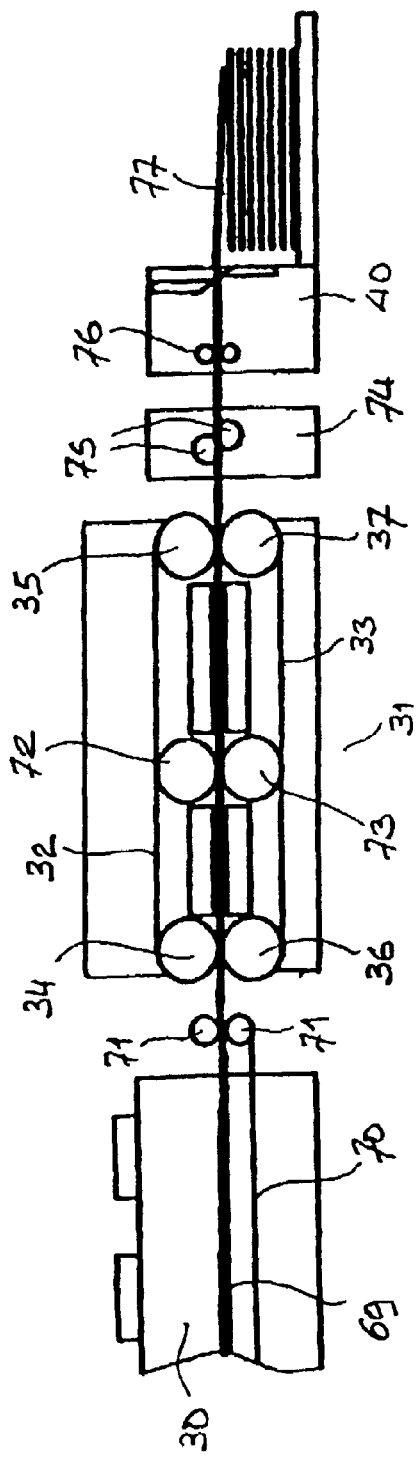
FIG. 3

PROCESS AND DEVICE FOR THE MANUFACTURE OF A COMPOSITE MATERIAL

The present invention relates to a process and to a device for making use of the said process for the manufacture of a composite material, formed by the association of reinforcing fibres, such as glass fibres, and of a thermoplastic organic material.

There are already numerous processes which make it possible to associate glass fibres and a thermoplastic organic material. The glass fibres may be in the form of a mat of continuous threads or of chopped threads and/or of fabrics; the organic material may be in the liquid form or in the solid state in the form of powder, film, sheet or of threads. The choice of the form in which the glass fibres and the organic material are associated depends on the configuration of the article to be produced and on the properties which are required for the said article.

Also, when the configuration of the article is relatively simple and when its mechanical properties must be high, the reinforcement chosen is in most cases in the form of fabric. The utility certificate FR-2 500 360 illustrates the use of reinforcement of this type: the manufactured articles are flat panels or curved articles which are produced by hot pressing of superposed layers of fabrics of, for example, glass fibres; the thermoplastic organic material associated with the glass thread fabrics being in the filamentary form. These thermoplastic threads may be warp or weft threads or both at the same time. During the hot pressing these threads melt and, on cooling, will bind the glass fabric layers together. The composite laminates thus produced are characterized by a high content of reinforcing fibres.

The process for the manufacture of these laminates is a noncontinuous process, according to which a number of layers of fabrics are superposed and the combination of the said layers is then heated while they are being compressed in a static press.

More recently, U.S. Pat. No. 5,227,236 has proposed an improvement to the process described above: the improvement consists in the use of mixed or, preferably, commingled threads which are sized with a dispersion or an emulsion of a thermoplastic polymer. Mixed threads should be understood to mean threads obtained by the simultaneous assembling and reeling of reinforcing threads such as glass threads and thermoplastic organic threads; commingled threads should be understood to mean threads obtained by the assembling and reeling of a multiplicity of reinforcing filaments and of thermoplastic organic filaments, the said filaments having previously been separated by mechanical means from their original threads. The melting point of the polymer employed for sizing these threads is lower than that of the organic filaments. Thus sized, these threads are employed in the form of fabrics. By virtue of this improvement the time needed to produce a sheet by hot pressing is found to be reduced. However, this, too, is a noncontinuous process.

For the production of composite articles of complex configuration it is known to employ a reinforcement which has the advantage of being in the form of a continuous thread which can be moved with the thermoplastic organic material under the effect of the pressure exerted during the moulding operation.

The manufacture of such a product which is suitable for moulding is described, for example, in U.S. Pat. No. 4,277,531. According to this patent, a mat of continuous glass threads is, in a first step, needled in order to give it the cohesion needed for its being handled; in a second step, on a manufacturing line, two strips of mat which has thus been needled are brought along parallel paths to a hot-pressing device, where they are combined. The lower face of the bottom strip rests on a film of thermoplastic organic material; the upper face of the topmost strip is also covered with a film of the same kind. Just before the mat strips are combined, a device deposits a layer of thermoplastic material in the liquid state. This combination is simultaneously heated and compressed so as to ensure at least partial melting of the films of organic material and, after cooling, the bonding of the threads of which the mats consist.

This process has the advantage of permitting the continuous manufacture of a sheet of a composite material which is ready to be moulded. However, while the product thus obtained is easily mouldable, the content of reinforcing fibres in the final article remains limited.

The subject of the present invention is a process which makes it possible to manufacture continuously a composite product in which the content of reinforcing fibres is higher than that attained by the continuous processes known hitherto.

The subject of the present invention is a process which makes it possible to manufacture continuously a composite product in sheet form, at a rate which is at least as high as that of the best continuous processes known in this field.

Another subject of the present invention is a process which makes it possible to manufacture continuously a composite product in sheet form, which combines the mouldability characterizing the products which contain nonwoven reinforcements and which gives the product obtained by moulding the level of mechanical properties that characterizes products containing woven reinforcements.

The objectives of the invention are attained by virtue of a process which consists:

in continuously depositing onto a moving substrate glass threads of which at least 80% by weight thereof are commingled threads consisting of glass filaments and of filaments of thermoplastic organic material which are intimately blended, the quantity of glass deposited representing more than 40% by weight of the total quantity of material deposited in the form of glass threads and of organic material, in transferring this glass threads-organic material combination into a number of zones where the said combination is heated, compressed and cooled, the heating and/or the cooling of the said combination being simultaneously accompanied by its compression, in cutting up the said combination in the form of sheets or in winding it onto a rotating drum.

Commingled threads are intended to mean threads in which glass filaments and filaments of thermoplastic organic material are intimately blended. These threads can be obtained by mechanical means as described, for example, by U.S. Pat. No. 4,818,318. According to this patent the reinforcing threads and the thermoplastic threads are extracted from their respective windings and then the filaments of which they consist are separated in the form of two sheets of the same width. These sheets are next brought into contact with one another to form only a single sheet, the two kinds of filaments being alternated as uniformly as possible. All the filaments thus blended are combined into a single thread.

Commingled threads are also intended to mean those which are directly obtained during the manufacture of thermoplastic organic filaments and of glass filaments. Processes permitting the manufacture of such a thread are described, for example, in patent applications EP-A-0 599

695 and EP-A-0 616 055. In these processes, filaments obtained by extrusion and mechanical drawing of a thermoplastic organic material in the molten state are drawn in the form of a sheet and are blended with a bundle or a sheet of glass filaments (or are sprayed into the said bundle or the said sheet), the said glass filaments being also in the course of being drawn. By virtue of this kind of process a thread within which the various filaments are blended homogeneously is thus obtained directly.

A moving substrate is intended to mean a strip of material formed by the combination of threads of glass and of a thermoplastic organic material, for example a strip of fabric formed by glass threads of which at least 80% by weight thereof are commingled threads as defined above.

A moving substrate is also intended to mean a conveyor which carries the glass threads-organic material combination from one point to another of a manufacturing line.

According to a first embodiment of the process according to the invention the glass threads and the material which are deposited continuously onto the substrate are exclusively in the form of at least one strip of fabric and/or of knit which are formed at least partially by commingled threads.

The fabrics employed within the scope of the invention include commingled threads which may be warp or weft threads, preferably both at the same time. Similarly, the knits employed may consist partially or totally of commingled threads.

According to a second embodiment of the invention the material deposited onto the substrate is exclusively in the form of chopped threads.

According to a third embodiment the material deposited onto the substrate is exclusively in the form of continuous threads. These threads may be deposited in the direction of movement in the substrate or in the form of superposed loops.

According to a fourth embodiment of the invention, at least one strip of fabric and/or of knit which are formed at least partially of commingled threads is deposited onto a substrate and at least one sheet of commingled threads, chopped or continuous, is also deposited, the said sheet(s) being brought into contact with at least one of the faces of the said strip(s), and then the sheet(s) of threads-strip(s) of fabric and/or knit combination thus formed is heated and is compressed on its two faces before being cooled and cut up.

According to a first alternative form of this latter embodiment:

a)—a sheet of chopped commingled threads is deposited onto a moving conveyor,
b)—a strip of fabric formed exclusively by commingled threads is deposited onto the said sheet,
c)—a second sheet of chopped commingled threads is optionally deposited onto the strip of fabric,
d)—the sheet(s)-strip(s) combination thus formed is transferred into a first zone where the said combination is heated and then into a second zone where the said combination is simultaneously compressed and heated,
e)—the said combination is then transferred into a third zone in which it is compressed and cooled,
f)—the said combination thus cooled is cut up at the exit of the third zone.

According to a second alternative form of this embodiment:

a)—a first strip of fabric formed exclusively by commingled threads is deposited onto a moving conveyor,
b)—a sheet of chopped commingled threads is deposited onto this strip,
c)—a second strip of fabric exclusively formed by commingled threads is deposited onto this sheet,
d)—a second sheet of chopped commingled threads is optionally deposited onto this latter strip of fabric,
e)—the strip(s)-sheet(s) combination thus formed is transferred into a first zone where the said combination is heated, and then into a second zone where the said combination is simultaneously compressed and heated,
f)—the said combination is transferred into a third zone in which it is compressed and cooled,
g)—the combination thus cooled is cut up at the exit of the third zone.

According to a third alternative form of this embodiment:

a)—a first strip of fabric formed exclusively by commingled threads is deposited onto a moving conveyor,
b)—one or more continuous commingled threads are deposited onto this strip,
c)—a second strip of fabric formed exclusively by commingled threads is deposited onto the said continuous thread(s),
d)—one or more continuous commingled threads or a sheet of chopped commingled threads is optionally deposited onto this latter strip of fabric,
e)—this strip(s)-sheet(s) combination thus formed is transferred into a first zone where the said combination is heated, and then into a second zone where the said combination is simultaneously compressed and heated,
f)—the said combination is transferred into a third zone in which it is compressed and cooled,
g)—the combination thus cooled is cut up at the exit of the third zone.

Within the scope of the fourth embodiment of the invention and of its alternative forms the width of the sheet(s) of commingled threads which is (are) deposited is preferably equal to the width of the strip(s) of fabric and/or of knit with which it is (they are) combined.

When strips of fabric and/or of knit and sheets of chopped or continuous threads are combined, sheets are obtained in which the middle part and/or at least one of the surface layers consist of at least one layer of glass threads capable of moving in a mould during the operation of moulding of the said sheets.

When a sheet of chopped threads is deposited, it may be obtained from a distributing device situated at the base of a storage hopper for prechopped commingled threads. It is also possible to obtain this sheet directly from a cutter fed continuously with a multiplicity of rovings of commingled threads extracted from a multiplicity of windings.

The layer of continuous commingled threads may be obtained by scattering one or, preferably, more thread(s) with the aid of one or more devices continuously fed with one or more threads extracted from windings.

The sheets or the layers of continuously deposited threads are preferably of the same width as the strips of the fabric which are employed.

In the process according to the invention the weight of glass which is deposited may represent at least half of the total weight of material deposited onto the conveyor.

Figure 2:
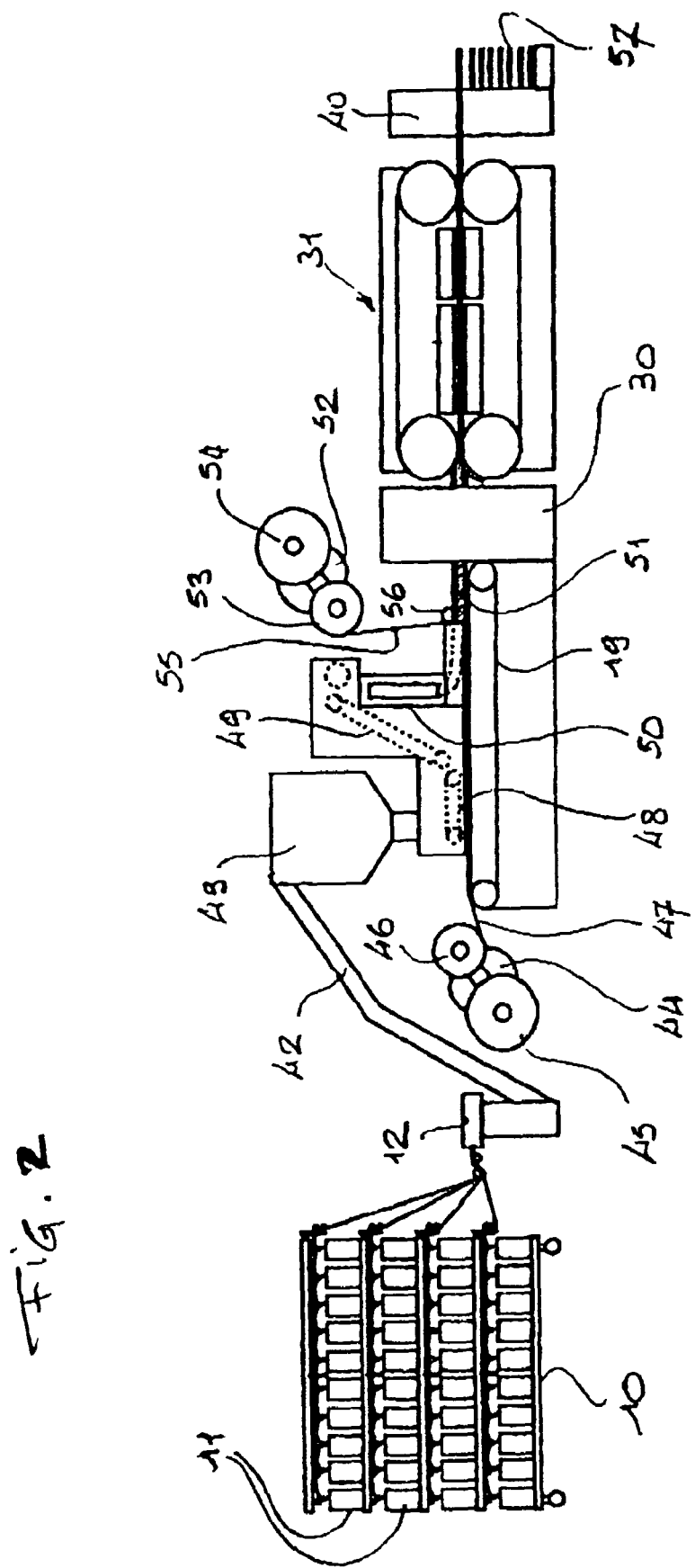
Figure 4:
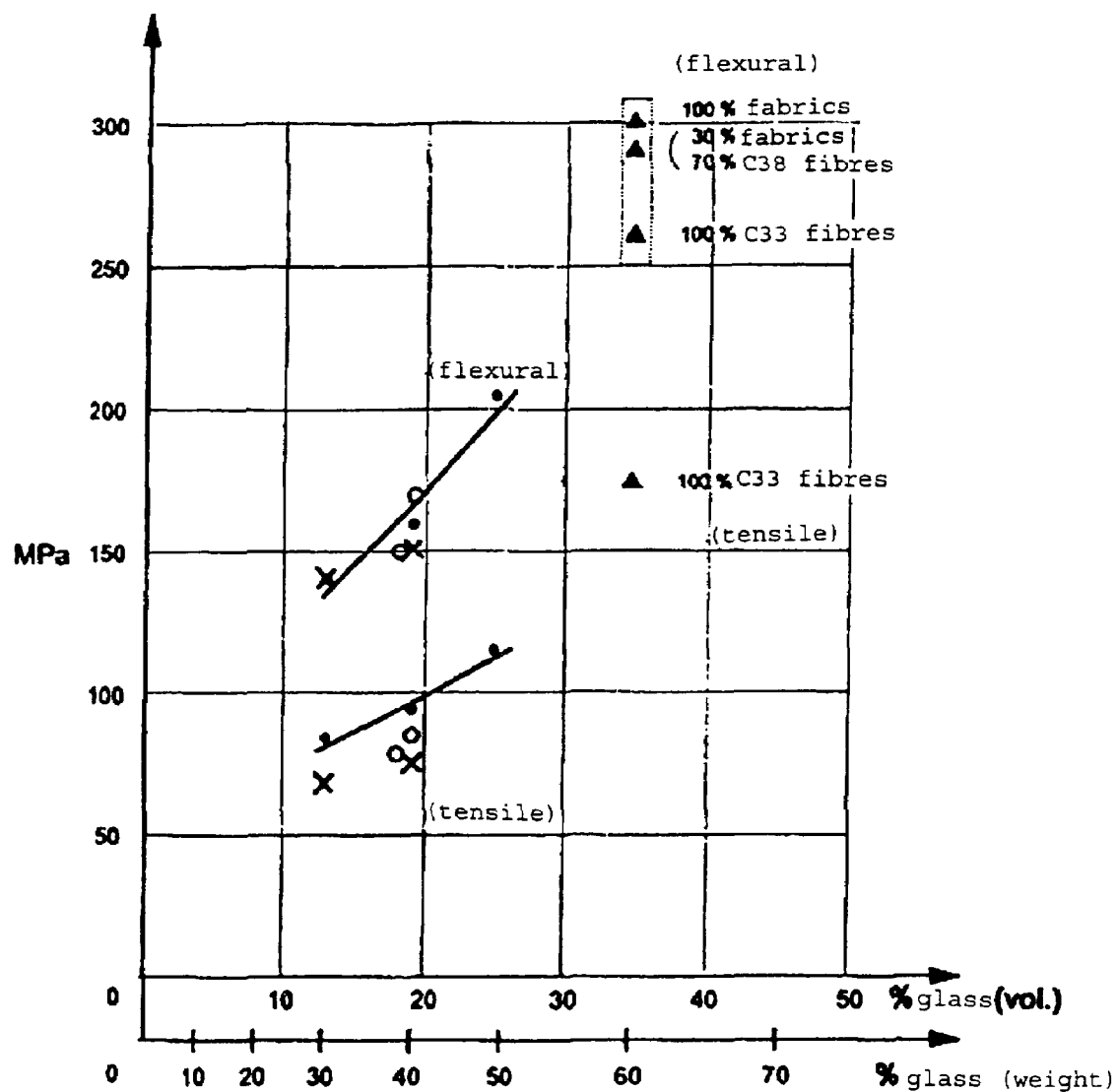

The detailed description below will allow the invention and the advantages which it offers to be appreciated better. This description will be illustrated by a number of figures which represent:

FIG. 1: a device which permits a first implementation of the invention,

FIG. 2: a device which permits a second implementation of the invention,

FIG. 3: a device which permits a third implementation of the invention,

FIG. 4: a graph on which are plotted the mechanical characteristics of composite products obtained according to known processes and according to the invention.

These various devices are described by way of examples and cannot in any way constitute a limitation of the invention.

FIG. 1 shows diagrammatically a line for production of rigid void-free composite sheets which includes upstream at least one multistorey creel 10 on which is placed a multiplicity of windings of commingled threads 11. The threads extracted from these windings are guided and combined by various members before entering a cutter 12. The chopped threads are collected an transferred by means of a conveyor belt 13 into a storage silo 14.

A capacitor with a perforated drum 15, joined by a conduit 16 to the base of the silo 14, feeds chopped threads to a first coater shaft 17 as commonly employed in the textile industry.

This shaft 17, equipped with a metering device, distributes the chopped threads in the form of a first sheet 18 onto a moving conveyor 19.

Downstream of the shaft 17 and above the conveyor 19 is installed a device with a small barrel 20 provided with two spindles which are free in rotation and support two rolls of fabrics 21 and 22, made up of commingled threads. A strip of fabric 23, extracted from the roll 21, is applied by means of a device 24 onto the sheet 18. When the roll 21 is finished, the device 20 pivots by 180° in order to continue the unwinding of a strip of fabric from the roll 22. To facilitate changing the roll, a fabricaccumulator and a device ensuring the positioning of the strip 23 (which are not shown) are fitted between the small barrel 20 and the device 24. These devices are shown in FIG. 3, which itself illustrates another embodiment of the invention, and are commented on below.

Downstream of the device 20 is fitted a second shaft 25, also fed with chopped threads by virtue of a capacitor with a perforated drum 26 connected by a conduit 27 to the silo 14. This shaft 25, equipped with a metering device, distributes the chopped threads in the form of a second sheet 28 onto the strip of fabric 23. This sheet is compressed by means of a device 29 placed at the exit of the said shaft.

This "sandwich" formed by a strip of fabric of commingled threads, taken between two sheets of commingled chopped threads, is introduced into a preheating oven 30. This oven allows this sandwich to be heated to a temperature which is higher than the melting temperature of the thermoplastic organic material of which a portion of the filaments blended with the glass filaments is formed. This heat treatment can be carried out, for example, by means of hot air.

Thus heated, the sandwich then enters a press 31 of a known type, for example such as that described in U.S. Pat. No. 4,277,531.

This press essentially includes two belts 32 and 33, driven respectively by rolls 34, 35 in the case of the first one and 36 and 37 in the case of the second one. The rolls 34 and 36 are heated; the rolls 35 and 37 are cooled. It also includes, between these two pairs of rolls, two zones in which the sandwich is compressed on its two faces and is driven. In the first zone 38 the means of pressing contribute to the heating of the sandwich to a temperature which is higher than the melting temperature of the thermoplastic organic material; in the second zone 39 the means of pressing perform a cooling function which is supplemented by the action of the rolls 35 and 37.

A cooled, rigid strip comes out of the press 31 and is cut up by an automatic guillotine device 40 in the form of sheets 41.

FIG. 2 shows diagrammatically a line for production of rigid void-free composite sheets according to a second embodiment of the invention. As in the preceding embodiment, a creel 10, on which a multiplicity of windings of commingled threads 11 is placed, is fitted at the beginning of the line. These threads also feed a cutter 12. The threads chopped by this means are collected and transferred by a conveyor belt 42 to the top of a hopper 43 placed above a moving conveyor 19.

Upstream of this conveyor is fitted a device with a small barrel 44 provided with two spindles which are free in rotation and support two rolls of fabric 45 and 46, which are made up of commingled threads. A strip of fabric 47, extracted from the roll 46, is applied onto the conveyor 19. The hopper 43, which enables a sufficient quantity of threads to be stored in order to work on the cutter without interrupting the manufacture, is used to feed, through the intermediacy of conveyor belts 48 and 49, a coater shaft 50. The latter delivers a sheet of chopped threads 51 onto the moving belt 47.

Downstream of the shaft 50 is fitted, above the conveyor, a second device with a small barrel 52 provided with two spindles which are free in rotation, which support two rolls of fabric 53 and 54, also made up of commingled threads. A strip of fabric 55 is extracted from the roll 53 and is applied onto the sheet 51 at the exit of the shaft 50, by virtue of a device 56. As in the case of the first embodiment, a fabric-accumulator and a device ensuring the positioning of the strip of fabric (which are not shown) are fitted between the small barrel 44 and the upstream part of the conveyor 19 and between the small barrel 52 and the device 56 (see FIG. 3).

This "sandwich" made up of a sheet of chopped threads taken between two strips of fabric is, as previously, introduced into a preheating oven 30 before entering a press 31 which is identical with that described in the context of the first embodiment of the invention. The rigid sheet which comes out of it is cut up by a guillotine device 40 in the form of sheets 57.

FIG. 3 shows diagrammatically a line for production of rigid void-free composite sheets according to a third embodiment of the invention.

As in the embodiments described above, a creel 10 on which is placed a multiplicity of windings 11 of commingled threads is installed upstream of the line. These threads are extracted from the windings 11 and are then guided and combined by various devices to form rovings 58.

The extraction of these threads is carried out by means of three devices 59 which are at the same time devices for driving and distributing the said rovings. These devices are enclosed in a housing 60 fitted above the upstream part of the conveyor 19.

This line also includes two devices with a small barrel 44 and 52 which support rolls of fabric made up of commingled threads fitted, as in the line shown in FIG. 2, upstream and downstream of the devices 59 for distributing the rovings.

A first strip of fabric 61, consisting of commingled threads, is unwound at constant tension from the roll 46. This strip runs into a fabric-accumulator 62 and then into a rotary frame 63 fitted with a selvage-detector which allows it to be positioned accurately before the said strip comes into contact with the conveyor 19. When the roll 46 is finished, the small barrel 44 pivots in order to place the roll 45 in an unwinding position.

The end of the strip 61 is stopped at the device 64 for the time needed to sew it to the beginning of the strip from the roll 45. During this time the reserve 62 provides the feed of fabric to the line.

A second strip of fabric 65, also consisting of commingled threads, is deposited onto the sheet of rovings 58 which have themselves been deposited onto the strip of fabric 61. This strip 65 is unwound at constant tension from the roll 54; it runs into a fabric-accumulator 66 and then, after a return 67, into a rotary frame 68 equipped with a selvage-detector which enables the said strip to be positioned accurately in relation to the strip 61 and the sheet of rovings 58.

The sandwich 69 made up of the sheet of rovings 58 and the strips 61 and 65 enters a hot air oven 30 supported by a perforated and relatively nonadhesive strip 70, for example a PTFE-coated glass arid. When passing through this oven the sandwich 69 is heated to a temperature above the melting temperature of the thermoplastic organic material. On leaving the oven the sandwich is reduced in volume by being lightly compressed between the rolls 71.

As in the preceding embodiments, the sandwich next enters a press 31 equipped with two belts 32 and 33, in which it is heated to a temperature which is higher than the melting temperature of the thermoplastic organic material. Between the rolls 34 and 36, which are heated, and the rolls 35 and 37, which are cooled, this press is equipped with a pair of rolls 72 and 73, which are heated. These rolls also compress the sandwich and promote the removal of the air which is still present therein.

A cooled, rigid strip comes out of the press 31 and runs into a device 74 equipped with saws 75 which remove the selvages from the said strip.

As in the preceding embodiments, this strip is cut transversely by a guillotine device 40, controlled automatically by haul-off rolls 76 which are adjusted to obtain sheets 77 of a determined length.

In these examples of embodiment of the invention, any one device or other can be replaced by another device which, as a whole, performs the same function. Thus, the press 31 could be replaced by a calender equipped with several pairs of rolls ensuring a progressive decrease in the temperature of the sandwich, or by a calender made up of a single pair of thermostated rolls, followed by twin belts ensuring the movement and the cooling of the said sandwich.

The process according to the invention and its implementation which have been described above make it possible to produce continuously composite sheets in which the glass thread content can reach and exceed 60% by weight.

Thus, by way of example, composite sheets have been produced in the following conditions by employing a production line as illustrated by FIG. 3.

The fabrics employed have a balanced 2 twilled 2 bound weave of 650 g/m² including 4 identical weft and weave rovings. These rovings comprise 800 glass filaments with a mean diameter of 17 micrometers and 800 polypropylene filaments with a mean diameter of 22 micrometers. The sheet of chopped commingled threads is made up from the same rovings.

A first strip of fabric (61) 1.4 meters in width, is unwound and deposited on the conveyor (19) which travels at the speed of 2 meters per minute.

The cutters (59) placed above the conveyor (19) deliver 8 kilogrammes of chopped threads per minute. These chopped threads, 38 millimeters in length, are deposited onto the strip (61) and form a sheet of 2.8 kilogrammes per square meter.

A second strip of fabric (65) is unwound and deposited onto the sheet thus formed.

The sandwich (69) thus formed runs into the oven (30) heated to 200° C. by means of hot air circulation. On leaving the oven (30) the sandwich (69) is compressed with the aid of the two water-cooled rolls (71). The sandwich, the thickness of which is then approximately 5 millimeters, enters the belt press (31). In the first zone of this press, included between the pairs of rolls (34, 36) and (72, 73), which are heated, the sandwich is heated to a temperature of the order of 230° C. In the second zone of this press, included between the pairs of rolls (72, 73) and (35, 37), the latter pair being cooled, the sandwich is progressively cooled to a temperature of the order of 30° C. During the passage of these two zones the sandwich is subjected to a pressure of the order of 1.5 bar. A planar product, the thickness of which is approximately 3 millimeters, leaves the press (31) and is trimmed and then cut up in the form of sheets. A one-square metre sheet weighs approximately 4.2 kilogrammes.

In the graph shown in FIG. 4 are plotted, as ordinate, the values of the tensile and flexural strengths, expressed in megapascals, of various glass-polypropylene composite products whose glass content, expressed in percentages by weight and by volume, is plotted as abscissae.

The products whose glass content has a top value of 50% by weight are obtained by continuous manufacturing processes of the prior art; those in which the glass content is equal to 60% by weight are obtained by the process according to the invention.

The continuous manufacture processes of the prior art combine glass threads and polypropylene films by heating and compression.

In the final product these glass threads can be present either in the form of a mat of chopped threads (shown as x) or in the form of a mat of continuous threads (shown as ○, •).

The values of the tensile strengths of the products obtained according to the present invention (shown as )) relate both to products manufactured solely from fabrics, themselves exclusively consisting of commingled threads, and to products manufactured solely from chopped commingled threads (C33—length 33 millimeters) and to mixed products such as that whose manufacture has been described, by way of example, above (30% fabrics; 70% C38 threads).

Independently of the fact that the process according to the invention makes it possible to obtain continuously composite products in which the glass content is higher than that in the products obtained according to the known processes, the extrapolation of the straight lines passing through the values of the strengths of the known products shows that the strengths of the products according to the invention are at least equal to, or even higher than, those which it would be rightful to expect merely as a result of the increase of the glass content. This shows that the quality of the wetting of the glass threads by the thermoplastic organic material reaches an exceptional level.

The products obtained by the process according to the invention are particularly well suited for obtaining, by moulding or by stamping, articles of complex shape like, for example, the very numerous composite components that form part of the design and the manufacture of motor vehicles. In this respect, the mixed products combining fabrics and chopped or continuous threads simultaneously combine the good distribution of the reinforcement in a mould of complex shape and the high level of mechanical properties which are required of the component which is produced.

What is claimed is:

1. A process for continuously manufacturing a rigid void-free composite product, comprising the steps of:
preparing intimately blended commingled threads containing glass filaments and filaments of thermoplastic organic material;
providing a strip of fabric made from the intimately blended commingled threads and a plurality of continuous threads including at least 80% by weight of the intimately blended commingled threads;
continuously depositing onto a moving conveyor two layers, one of the two layers including said plurality of continuous threads in a form of at least one of continuous threads continuously deposited in a direction of movement of said moving conveyor, continuous threads continuously deposited in a form of superposed loops and continuous threads continuously deposited in a form of chopped threads, and the other one of the two layers including said strip of fabric;
continuously transferring said two layers combined through a plurality of zones where said two layers are heated and cooled, while being sufficiently compressed to form a continuous rigid void-free composite material capable of being molded; and
at least one of cutting up said rigid void-free continuous composite material into a plurality of sheets and winding said continuous rigid void-free composite material onto a rotating drum,
wherein said glass filaments deposited in said process in total comprise more than 40% by weight of said glass filaments and said filaments of thermoplastic organic material deposited in said process.

2. A process according to claim 1, wherein a combination of said two layers thus formed is heated and is compressed on two faces before being cooled and cut up or wound.

3. A process according to claim 2, wherein:
said one of the two layers is continuously deposited on said moving conveyor and is formed of said chopped threads;
said other one of the two layers is continuously deposited on said one of the two layers and is formed exclusively by said intimately blended commingled threads;
a third layer of chopped intimately blended commingled threads of glass filaments and filaments of a thermoplastic organic material is continuously deposited onto said other one of the two layers;
a combination of said two layers and said third layer thus formed is continuously transferred into a first zone where said combination is heated and then into a second zone where said combination is sufficiently compressed and heated to become rigid and void-free;
said combination is then continuously transferred into a third zone where said combination is sufficiently compressed and cooled to become rigid and void-free, thereby forming a continuous rigid void-free composite material capable of being molded; and
said continuous rigid void-free composite material is cut up at an exit of the third zone.

4. A process according to claim 2, wherein:
said other one of the two layers is continuously deposited on said moving conveyor and is formed exclusively of said intimately blended commingled threads;
said one of the two layers is continuously deposited on said other one of the two layers and is formed of said chopped threads;
a third layer exclusively formed by intimately blended commingled threads of glass filaments and filaments of a thermoplastic organic material is continuously deposited onto said one of the two layers;
a fourth layer of chopped intimately blended commingled threads of glass filaments and filaments of a thermoplastic organic material is continuously deposited onto said third layer;
a combination of said two layers, said third layer and said fourth layer thus formed is continuously transferred into a first zone where said combination is heated, and then into a second zone where said combination is sufficiently compressed and heated to become rigid and void-free;
said combination is continuously transferred into a third zone where said combination is sufficiently compressed and cooled to become rigid and void-free, thereby forming a continuous rigid void-free composite material capable of being molded; and
the continuous rigid void-free composite material is cut up at an exit of the third zone.

5. A process according to claim 2, wherein:
said other one of the two layers is continuously deposited onto said moving conveyor and is formed exclusively by said intimately blended commingled threads;
said one of the two layers is continuously deposited on said other one of the two layers;
a third layer formed exclusively by commingled threads of glass filaments and filaments of a thermoplastic organic material is continuously deposited onto said one of the two layers,
a fourth layer is continuously deposited on said third layer, said fourth layer being formed of commingled threads of glass filaments and filaments of a thermoplastic organic material;
a combination of said two layers, said third layer and said fourth layer thus formed is continuously transferred into a first zone where said combination is heated, and then into a second zone where said combination is sufficiently compressed and heated to become rigid and void-free;
said combination is continuously transferred into a third zone where said combination is sufficiently compressed and cooled to become rigid and void-free, thereby forming a continuous rigid void-free composite material capable of being molded; and
the continuous rigid void-free composite material is cut up at an exit of the third zone.

6. A process according to claim 2, wherein the width of said one of the two layers is equal to the width of said other one of the two layers.

7. A process according to claim 1, wherein said one of the two layers comprises exclusively said chopped threads.

8. A process according to claim 1, wherein said other one of the two layers comprises exclusively continuous threads.

9. A process according to claim 1, wherein a weight of said glass filaments deposited in total represents at least half of a total weight of the two layers deposited onto the conveyer.

10. A process for continuously manufacturing a rigid void-free composite product according to claim 1, wherein the step of continuously transferring said two layers combined through said plurality of zones comprises the steps of passing said two layers through a:
first heating process configured to heat the two layers with two adjacent rolls, which heat and drive the two layers between two belts,
second heating process configured to heat and press the two layers between said two belts, first cooling process configured to cool and press the two layers between said two belts, and second cooling process configured to cool the two layers with additional two adjacent rolls, said additional rolls cool and drive the two layers between two belts.

11. A device for manufacturing a rigid void-free composite product, comprising:

a storage device for a plurality of windings of commingled threads containing glass filaments and filaments of a thermoplastic organic material;

a cutter fed with a plurality of continuous threads extracted from said windings;

at least one device positioned and configured to transfer, store, and distribute said commingled threads chopped by said cutter in a form of a sheet;

at least one barrel supporting at least two rolls of fabric made of said commingled threads;

a conveyor positioned and configured to receive said commingled threads thus chopped and a strip of said fabric;

a preheating oven placed at an end portion of the conveyor;

a twin-belt press including a plurality of heating drums in an upstream portion of said twin-belt press and a plurality of cooled rollers in a downstream portion and a central portion of said twin-belt press, said heating drums being configured to sufficiently heat and compress said commingled threads chopped and said strip of fabric to become rigid and void-free, and said cooled rollers being configured to sufficiently cool and compress said commingled threads chopped and said strip of fabric to become rigid and void-free, thereby forming a rigid void-free composite material capable of being molded; and an automatic guillotine device positioned and configured to cut the rigid void-free composite product, wherein said glass filaments deposited in said process in total comprise more than 40% by weight of said glass filaments and said filaments of thermoplastic organic material deposited in said process.

12. A device for manufacturing a rigid void-free composite product according to claim 11, further comprising:

a pair of adjacent heating rollers configured to preheat the commingled threads after the preheating oven;

a pair of adjacent cooling rollers configured to cool the composite material after the twin-belt press; and wherein a pair of conveyor belts drive the commingled threads therebetween and the conveyor belts are also driven around said adjacent heating rollers, said twin-belt press and said adjacent cooling rollers.

13. A device for manufacturing a rigid void-free composite product, comprising:

a storage device for a plurality of windings of commingled threads containing glass filaments and filaments of a thermoplastic organic material;

a conveyor positioned and configured to receive the commingled threads deposited in a form of at least one of strips of fabric, continuous threads and chopped threads;

a first barrel disposed upstream of said conveyor and supporting at least two rolls of fabric made of said commingled threads;

at least one distribution device configured to distribute said commingled threads in a form of continuous threads, said at least one distribution device being disposed above said conveyor;

a second barrel disposed downstream of said conveyor and supporting at least two rolls of fabric made of said commingled threads;

at least one of a second distribution device configured to distribute said continuous thread and a cutter followed by a third distribution device configured to distribute said continuous threads chopped by said cutter;

a preheating oven placed at an end portion of the conveyor;

a twin-belt press including a plurality of heating drums in an upstream portion of said twin-belt press and a plurality of cooled rolls in a downstream portion and a central portion of said twin-belt press, said heating drums being configured to sufficiently heat and compress said commingled threads deposited onto said conveyor to become rigid and void-free, and said cooled rollers being configured to sufficiently cool and compress said commingled threads deposited onto said conveyor to become rigid and void-free, thereby forming a rigid void-free composite material capable of being molded; and an automatic guillotine device positioned and configured to cut the rigid void-free composite product, wherein said glass filaments deposited in said process in total comprise more than 40% by weight of said glass filaments and said filaments of thermoplastic organic material deposited in said process.

14. A device for manufacturing a rigid void-free composite product according to claim 13, further comprising:

a pair of adjacent heating rollers configured to preheat the commingled threads after the preheating oven;

a pair of adjacent cooling rollers configured to cool the composite material after the twin-belt press; and wherein a pair of conveyor belts drive the commingled threads therebetween and the conveyor belts are also driven around said adjacent heating rollers, said twin-belt press and said adjacent cooling rollers.

* * * * *